(12) United States Patent
Okumura

(10) Patent No.: US 7,440,692 B2
(45) Date of Patent: Oct. 21, 2008

(54) DIGITAL CAMERA

(75) Inventor: Yoichiro Okumura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 337 days.

(21) Appl. No.: 11/436,093

(22) Filed: May 17, 2006

(65) Prior Publication Data

US 2006/0263080 A1    Nov. 23, 2006

(30) Foreign Application Priority Data

May 20, 2005   (JP)   ............... 2005-148170

(51) Int. Cl.
  *G03B 13/02*   (2006.01)
(52) U.S. Cl. ................... 396/374; 396/296; 348/333.09
(58) Field of Classification Search ......... 396/138–139, 396/141, 148, 150–151, 296, 322, 373–374, 396/378, 381; 348/220.01, 221.01, 333.01–333.03, 348/333.09
  See application file for complete search history.

(56) References Cited

U.S. PATENT DOCUMENTS 4,704,022 A    11/1987   Nozawa 6,639,626 B1    10/2003   Kubo et al.
2002/0191097 A1   12/2002   Kobayashi

FOREIGN PATENT DOCUMENTS

| JP | 2000-013661 | 1/2000 |
|---|---|---|
| JP | 2000-165730 | 6/2000 |
| JP | 2001-078069 | 3/2001 |
| JP | 2001-125173 | 5/2001 |
| JP | 2001-186401 | 7/2001 |
| JP | 2001-222059 | 8/2001 |
| JP | 2002-182268 | 6/2002 |
| JP | 2002-290780 | 10/2002 |
| JP | 2002-369042 | 12/2002 |
| JP | 2005-010643 | 1/2005 |
| JP | 2006-11025 | 1/2006 |

*Primary Examiner*—Bot LeDynh
(74) *Attorney, Agent, or Firm*—John C. Pokotylo; Straub and Pokotylo

(57) ABSTRACT

A digital camera includes a first imaging section for acquiring subject image data, a movable mirror for guiding the light beam of the subject to a finder optical system, and a second imaging section for capturing the subject image data in the finder optical system. In this structure, the image acquired by the first imaging section and the image acquired by the second imaging section are switched and selectively displayed depending on the movement of the movable mirror. For example, the digital camera can be configured such that the first imaging section is used to acquire a shot image and the second imaging section is used to acquire a live image.

12 Claims, 13 Drawing Sheets

DIGITAL CAMERA

CROSS-REFERENCE TO RELATED APPLICATION

This application is based upon and claims the benefit of priority from prior Japanese Patent Application No. 2005-148170, filed on May 20, 2005, the entire contents of which are incorporated herein by reference.

BACKGROUND OF THE INVENTION

1. Field of the Invention

The present invention relates to a digital camera. More particularly, the present invention relates to the improvement of a digital camera capable of displaying on a display screen both an image being viewed and an image being shot.

2. Description of the Related Art

Digital cameras are commonly known, which form an optical image of a subject on an image pickup device from light coming from the subject and passing through a photographing optical system, photoelectrically convert the optical image into electric image signals through the image pickup device, and display the resulting image on the screen of an image display device, such as an LCD monitor, based on the electric image signals.

As an example of such a camera displaying a subject image, a camera is known in which a movable mirror is formed as a half mirror to enable live-view display (for example, see Japanese Patent Laid-Open No. 2001-186401).

A camera is also known in which a half mirror is arranged in a finder optical system to guide a light beam of a subject to an image pickup device for live-view display (for example, see Japanese Patent Laid-Open No. 2000-165730).

The cameras described in Japanese Patent Laid-Open Nos. 2001-186401 and 2000-165730 are to display a live image during normal observation and a shot image at the time of shooting. Therefore, when sequential shootings are performed with these cameras, the live image and the shot image are frequently switched.

BRIEF SUMMARY OF THE INVENTION

The digital camera of the present invention has a first imaging section for acquiring subject image data, a movable mirror for guiding a light beam of a subject to a finder optical system, and a second imaging section for capturing the subject image data in the finder optical system. The images acquired by the first and second imaging sections are switched and displayed in different forms distinguishable from each other in response to the movement of the movable mirror.

For example, the digital camera can be configured such that the first imaging section is used to acquire a shot image and the second imaging section is used to acquire a live image. Thus, the switching of the images is synchronized with the movement of the movable mirror, and this makes it easy for a user to distinguish the two images.

When a mat screen is provided in the finder optical system, the second imaging section can preferably be configured to capture an image formed on the mat screen.

The second imaging section can also preferably be configured to acquire a focus frame on the mat screen or display information provided in the finder optical system together with the subject image data. In this case, the focus frame or the display information appear in the image acquired by the second imaging section, and this makes it easy for the user to distinguish the image from that acquired by the first imaging section.

As a specific structural example of the present invention, the digital camera comprises: a finder optical system including a plurality of mirrors for observation of a subject; a first imaging section for converting a light beam, coming from a subject through a photographing lens, into electric signals; a movable mirror capable of being moved in or out of the imaging optical path of the first imaging section so that, when located in the imaging optical path, it will guide the light beam of the subject to the finder optical system; a display section for displaying image data acquired by the first imaging section; a second imaging section, different from the first imaging section, for converting the light beam of the subject guided to the finder optical system into electric signals; and a control section for switching over between the image data acquired by the first imaging section and the image data acquired by the second imaging section in response to the movement of the movable mirror to selectively display either of the image data on the display section.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

First Embodiment

Figure 1:
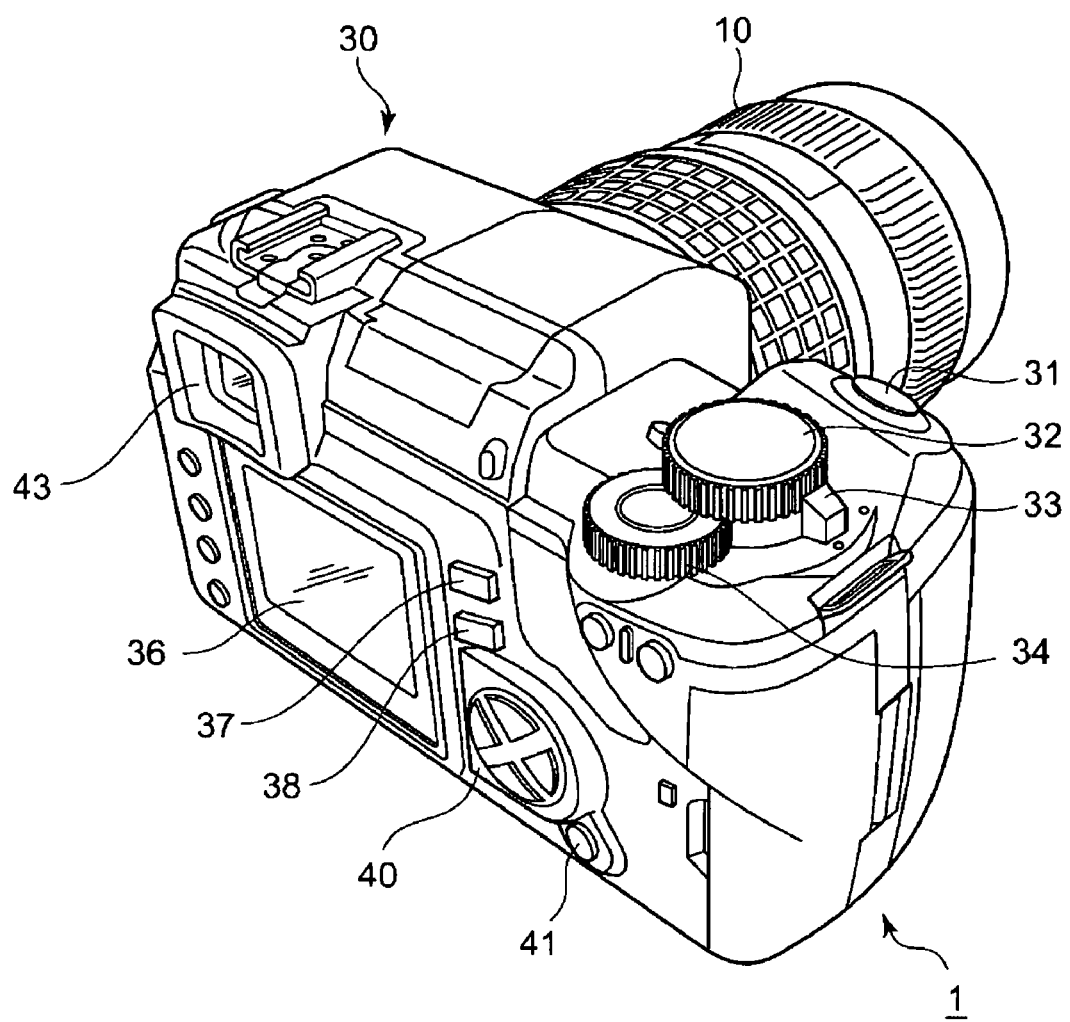
FIG. 1 is an outline perspective view showing the structure of a single-lens reflex digital camera to which an imaging device according to a first embodiment of the present invention is applied.

FIG. 1 is an outline perspective view showing the structure of a single-lens reflex digital camera to which an imaging device according to a first embodiment of the present invention is applied.

In FIG. 1, the single-lens reflex digital camera (hereinafter simply called the "camera") 1 consists principally of an interchangeable lens barrel 10 and a camera body 30. In this structure, a desired lens barrel 10 is removably mounted on the front of the camera body 30.

A shutter button 31, a mode dial 32, a power switch lever 33, a control dial 34, etc. are provided on the top face of the camera body 30.

The shutter button 31 is to perform shooting preparation and exposure operations. The shutter button 31 consists of two-step switches, namely a first shutter release switch and a second shutter release switch. When the shutter button 31 is pressed halfway, the first shutter release switch is turned on to perform shooting preparation operations, such as photometering and distance measuring. Then, when the shutter button 31 is pressed fully, the second shutter release switch is turned on to make an exposure.

The mode dial 32 is an operation part for allowing a user to set a shooting mode upon shooting. The mode dial 32 is rotated in a predetermined direction to set a shooting mode upon shooting. In the first embodiment, the mode dial 32 also has a function for switching over the image display in an LCD monitor between a finder mode and a live view mode as described in detail later. The power switch lever 33 is an operation part for allowing the user to power on or off the camera 1. When the power switch lever 33 is moved, the main power supply of the camera 1 is turned on or off.

The control dial 34 is an operation part for allowing the user to set shooting information. The user can set various shooting conditions upon shooting by operating the control dial 34.

Further, an LCD monitor 36 for displaying a shooting image, a menu, etc., a playback button 37, a menu button 38, an arrow pad 40, an OK button 41, a viewfinder 43 in an eyepiece optical system, etc. are arranged on the back face of the camera body 30.

The playback button 37 is to switch over the camera 1 to a playback mode capable of playing back a JPEG image file recorded in a flash ROM 84 or on a recording medium 85 as described in detail later. The menu button 38 is to display a menu screen on the LCD monitor 36. The menu screen consists of menu items in a multi-layered structure. The user can select a desired menu item using the arrow pad 40 and confirm the selected item by pressing the OK button 41.

Figure 2:
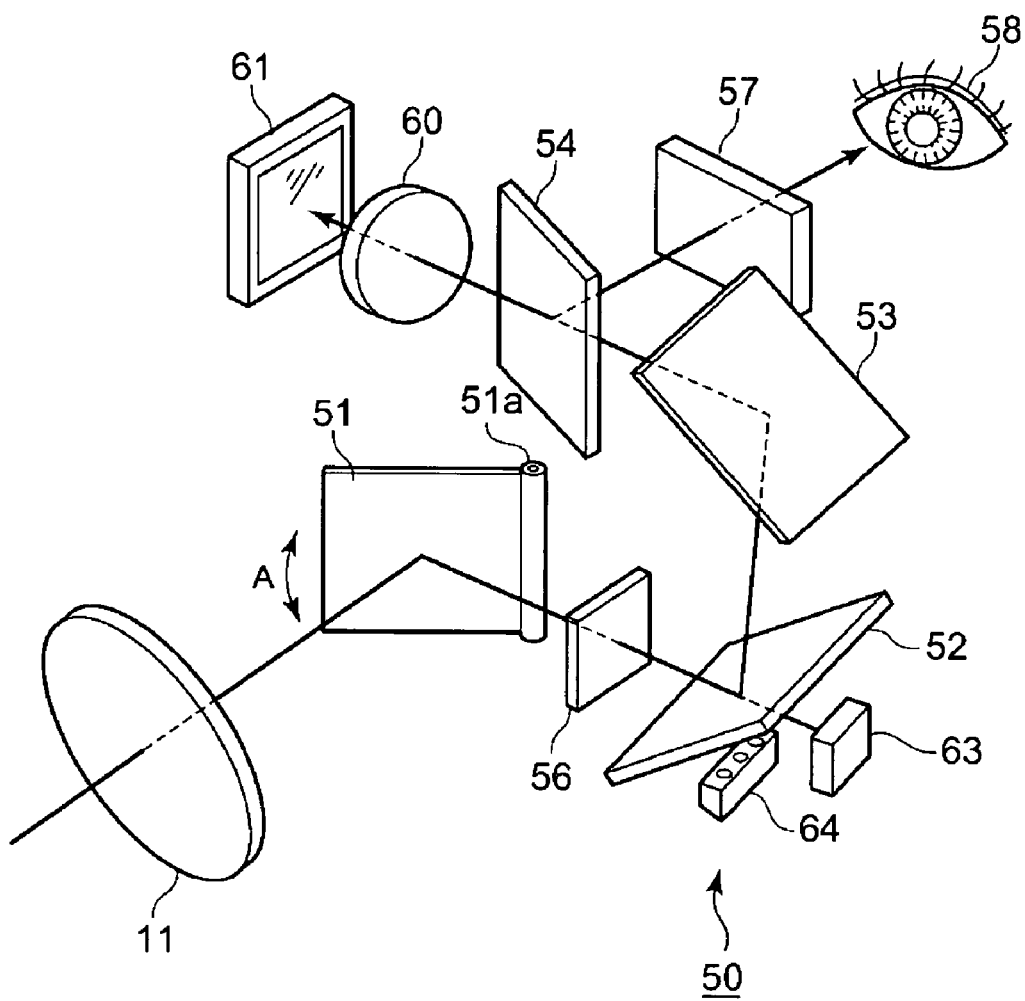
FIG. 2 is a perspective view showing the structure of a finder optical system of the camera according to the first embodiment of the present invention.

FIG. 2 is a perspective view showing the structure of a finder optical system of the camera according to the first embodiment of the present invention.

A finder optical system 50 consists principally of a plurality of mirrors for guiding a light beam coming from a subject and passing through a photographing lens 11 in the lens barrel 10 to an eyepiece lens 57 constituting part of the viewfinder 43, a focusing screen (matt screen) 56, and the eyepiece lens 57. The plurality of mirrors include a first reflection mirror 51, a second reflection mirror 52, a third reflection mirror 53, and a fourth reflection mirror 54.

The first reflection mirror 51 is configured to be rotatable about an axis 51a in both directions indicated by arrow A in FIG. 2. Part of the first reflection mirror 51 is formed into a half mirror for an AF sensor unit to be described later. As shown in FIG. 2, when a photographer is looking into the viewfinder 43 (FIG. 1) to observe a subject before shooting, the first reflection mirror 51 reflects a light beam incoming from the photographing lens 11 toward the second reflection mirror 52, at an angle of approximately 90° with respect to the optical axis of the photographing lens 11, that is, to the right in the camera body 30 as viewed from the lens barrel 10. Then, upon shooting, the first reflection mirror 51 is withdrawn out of the photographing optical path so that the light beam from the subject will be guided to an image pickup device (not shown) located behind the first reflection mirror 51.

The light beam reflected on the reflection surface of the first reflection mirror 51 is incident on the second reflection mirror 52 through the focusing screen 56. The second reflection mirror 52 is arranged in the optical axis of the reflected light from the first reflection mirror 51 and with its reflection surface tilted at a predetermined angle with respect to the optical axis of the reflected light from the first reflection mirror 51. In the first embodiment, the light beam reflected from the first reflection mirror 51 and incident on the second reflection mirror 52 is reflected upward in the camera body 30 at an angle of approximately 90° with respect to the optical axis of the reflected light from the first reflection mirror 51.

The light beam reflected on the reflection surface of the second reflection mirror 52 is incident on the third reflection mirror 53 arranged in the reflective optical axis of the reflection surface of the second reflection mirror 52 and with its reflection surface tilted at a predetermined angle with respect to the reflective optical axis of the reflection surface of the second reflection mirror 52. In the first embodiment, the light beam reflected from the second reflection mirror 52 and incident on the third reflection mirror 53 is reflected on the reflection surface of the third reflection mirror 53 at an angle of approximately 90° with respect to the reflective optical axis of the reflection surface of the second reflection mirror 52 in a direction opposite to the reflective direction of the reflection surface of the first reflection mirror 51. In other words, the light beam reflected from the reflection surface of the second reflection mirror 52 is reflected on the reflection surface of the third reflection mirror 53 to the left in the camera body 30. To sum up, the light beam reflected on the reflection surface of the first reflection mirror 51 is guided through the second and third reflection mirrors 52 and 53 as if it is turned back, and directed toward the fourth reflection mirror 54 because the reflective optical axis of the reflection surface of the third reflection mirror 53 is almost parallel to that of first reflection mirror 51.

The light beam reflected on the reflection surface of the third reflection mirror 53 is incident on the fourth reflection mirror 54 arranged in the reflective optical axis of the reflection surface of the third reflection mirror 53 and with its reflection surface tilted at a predetermined angle with respect to the reflective optical axis of the reflection surface of the third reflection mirror 53. Then, the light beam reflected from third reflection mirror 53 and incident on the fourth reflection mirror 54 is reflected on the reflection surface of the fourth reflection mirror 54 at an angle of approximately 90° with respect to the reflective optical axis of the reflected light from the third reflection mirror 53. In other words, the light beam reflected from the reflection surface of the fourth reflection mirror 54 is incident on the eyepiece lens 57 arranged on the reflective optical axis of the reflection surface of the fourth reflection mirror 54.

The focusing screen 56 has a diffusing surface for diffusing the light beam incident on it to form an optical image from the light beam incident in the finder optical system 50. The focusing screen 56 is arranged in a position optically equivalent to the imaging plane of an image pickup device 67 for capturing an image upon shooting as described later.

The second reflection mirror 52 and the fourth reflection mirror 54 are half mirrors. A photometric sensor 63 for measuring the brightness of the subject and a set of LEDs 64 for focused indication are arranged on the backside of the reflection surface of the second reflection mirror 52. The set of LEDs 64 is to cause a superimpose display to indicate where a focusing point is located on the screen in the viewfinder or the LCD monitor 36. On the other hand, an imaging lens 60 and an image pickup device 61 for producing a display image are provided on the backside of the reflection surface of the fourth reflection mirror 54. The image pickup device 61 for producing a display image (hereinafter simply called "for image display") is to be formed an image relayed from the image formed on the focusing screen 56 on it through the imaging lens 60. Therefore, the image formed on the image pickup device 61 for image display is the same as that observed by a photographer's eye 58 except that the image formed on the image pickup device 61 is reversed left to right.

The light beam of the subject from the photographing lens 11 is guided to the eyepiece lens 57 through the first to fourth reflection mirrors 51-54 so that the image in the viewfinder 43 will be an erect-unreversed image. Thus, the subject image formed on the focusing screen 56 can be observed by the photographer's eye through the eyepiece lens 57 (viewfinder 43).

In the first embodiment, the first reflection mirror 51, the second reflection mirror 52, the third reflection mirror 53, and the fourth reflection mirror 54 are all arranged to reflect the incident light beam at an angle of approximately 90°, but the present invention is not limited to this arrangement.

Figure 3:
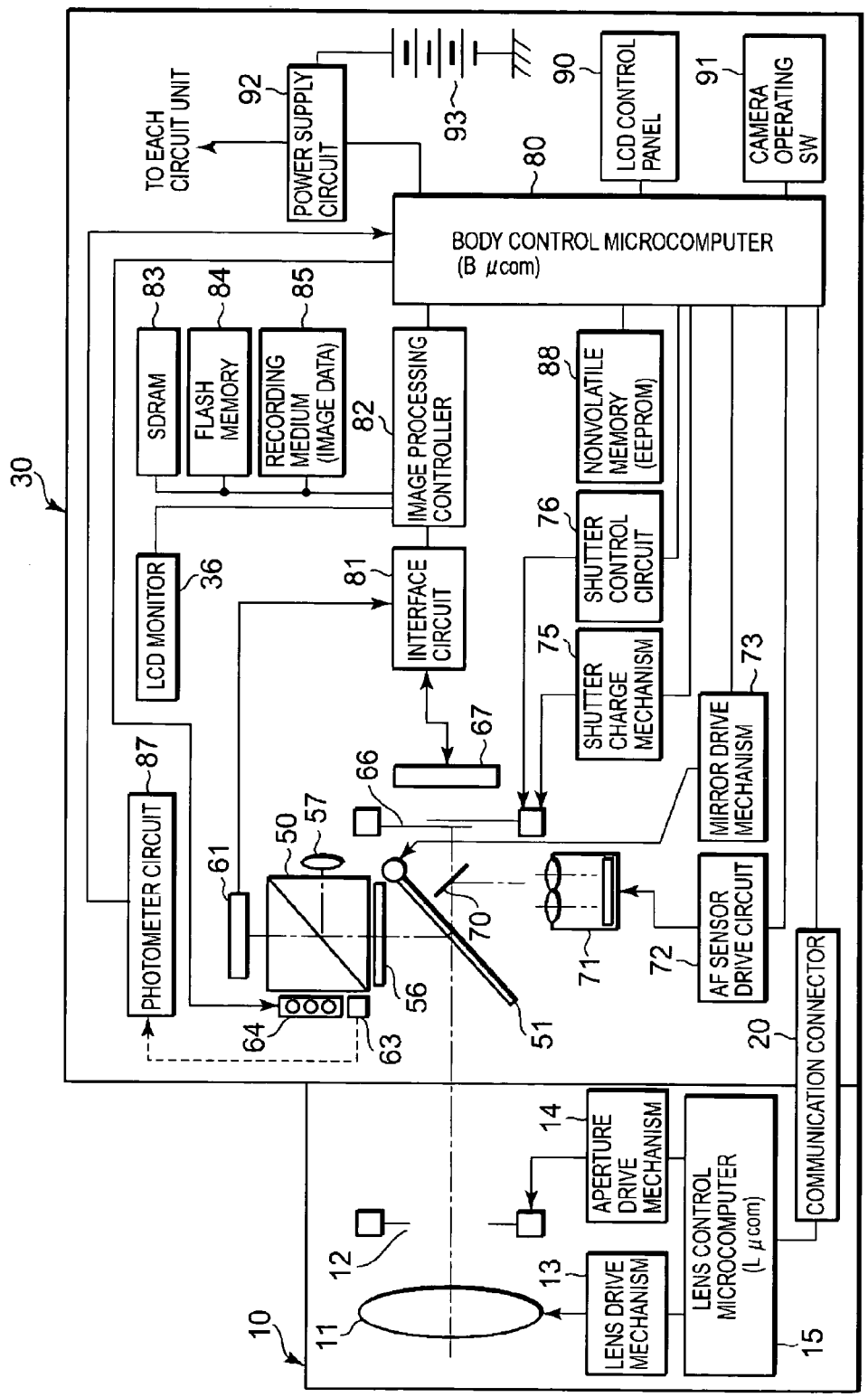
FIG. 3 is a block diagram showing a system configuration of the camera according to the first embodiment of the present invention.

FIG. 3 is a block diagram showing a system configuration of the camera according to the first embodiment of the present invention.

In FIG. 3, the lens barrel 10 is removably mounted on the camera body 30 through a mount, not shown, provided on the front face of the camera body 30. The lens barrel 10 includes the photographing lens 11, an aperture 12, a lens drive mechanism 13, an aperture drive mechanism 14, and a lens control microcomputer (hereinafter abbreviated as "L μcom") 15.

The photographing lens 11 is driven along its optical axis by a DC motor (not shown) provided in the lens drive mechanism 13. The aperture 12 is driven by a stepping motor (not shown) provided in the aperture drive mechanism 14. The L μcom 15 controls each component in the lens barrel 10, such as the lens drive mechanism 13 and the aperture drive mechanism 14. The L μcom 15 is electrically connected to a body control microcomputer (hereinafter abbreviated as "B μcom") 80 to be described later through a communication connector 20 so that it is controlled in accordance with instructions from the B μcom 80.

The camera body 30 is configured as follows.

A light beam from a subject, not shown, passing through the photographing lens 11 and the aperture 12 in the lens barrel 10 is reflected by the first reflection mirror 51 as a movable mirror and is incident on the focusing screen 56. Then, the light beam is guided to the eyepiece lens 57 through the second to fourth reflection mirrors 52-54 (see FIG. 2) constituting part of the finder optical system 50 together with the first reflection mirror 51. On the other hand, part of the light beam from the subject passes through the half mirror portion of the first reflection mirror 51, is reflected by a sub-mirror 70 movable independently of the first reflection mirror 51, and is guided to an AF sensor unit 71 for automatic distance measurement. In FIG. 3, although the first reflection mirror 51 is shown separately from the second to fourth reflection mirrors, it constitutes part of the finder optical system 50 together with the second to fourth reflection mirrors.

A focal-plane type shutter 66 and the image pickup device 67 for capturing an image upon shooting (hereinafter simply called "for image capturing") are provided behind the first reflection mirror 51 along the optical axis. The image pickup device 67 for image capturing is a photoelectric converter in an imaging optical system, such as a CCD, for photoelectrical conversion of light from a subject passing through the optical system to produce a subject image. In other words, when the first reflection mirror 51 is withdrawn out of the optical path, the light beam passing through the photographing lens 11 and the aperture 12 forms an image on the imaging plane of the image pickup device 67 for image capturing.

Further, as mentioned above, the finder optical system 50 is configured such that the photometric sensor 63 and the set of LEDs 64 for focused indication are arranged near the second reflection mirror 52, and the image pickup device 61 for image display is arranged near the fourth reflection mirror 54. The image pickup device 61 for image display and the image pickup device 67 for image capturing are connected to an image processing controller 82 for image processing through an interface circuit 81. The LCD monitor 36 is also connected to the image processing controller 82. An SDRAM 83, the flash memory 84, the recording medium 85, etc. as memory areas are further connected to the image processing controller 82. The LCD monitor 36 and these memory areas are configured to allow the camera to provide an electronic recording/display function as well as an electronic imaging function.

The recording medium 85 is an external recording medium such as one of various types of memory cards removably inserted into the camera body 30 through a camera interface, not shown, or an external hard disk drive (HDD).

The image processing controller 82 is connected to the B μcom 80 for controlling each component of the camera body 30. The photometric sensor 63 through a photometer circuit 87, an AF sensor drive circuit 72, a mirror drive mechanism 73, a shutter charge mechanism 75, a shutter control circuit 76, and a nonvolatile memory (EEPROM) 88 are also connected to the B μcom 80. An LCD control panel 90 for displaying the operating state of the camera, a camera operating-switch part (SW) 91, and a battery 93 through a power supply circuit 92 are further connected to the B μcom 80. The LCD control panel 90 is to provide a display screen to the photographer to show the operating state of the camera.

The B μcom 80 and the L μcom 15 are electrically connected through the communication connector 20 when the lens barrel 10 is mounted on the camera body 30. The L μcom 15 cooperates dependently with the B μcom 80 to operate the digital camera.

The AF sensor drive circuit 72 is to control the drive of the AF sensor unit 71, and the mirror drive mechanism 73 is to control the drive of the first reflection mirror 51. The shutter charge mechanism 75 is to charge a spring for driving front and rear curtains, not shown, constituting the shutter 66. The shutter control circuit 76 not only controls the traveling of the front and rear curtains of the shutter 66, but also exchanges with the B μcom 80 a signal for controlling the opening/closing of the shutter and a signal synchronizing with the firing of an electronic flash. The photometer circuit 87 performs photometric processing based on an electric signal from the photometric sensor 63.

The nonvolatile memory 88 is a memory storing control parameters necessary for control of the camera as a storage area other than the SDRAM 83, the flash memory 84, and the recording medium 85. The nonvolatile memory 88 is provided accessible from the B μcom 80.

The LCD control panel 90 is to provide a display screen to the photographer to show the operating state of the camera. The camera operating-switch part 91 is a group of switches including operation buttons necessary to operate the camera such as the shutter release switches, a mode change switch, a power switch, etc. The second shutter release switch in the shutter release switches is not only to instruct shooting but also to switch the position of the first reflection mirror 51 between the inside and outside of the shooting optical path. The mode change switch is to switch over between the shooting mode and an image display mode. The power supply circuit 92 is provided for converting the voltage of the battery 93 as a power source and supplying a voltage necessary for each circuit unit of the camera system.

Figure 4:
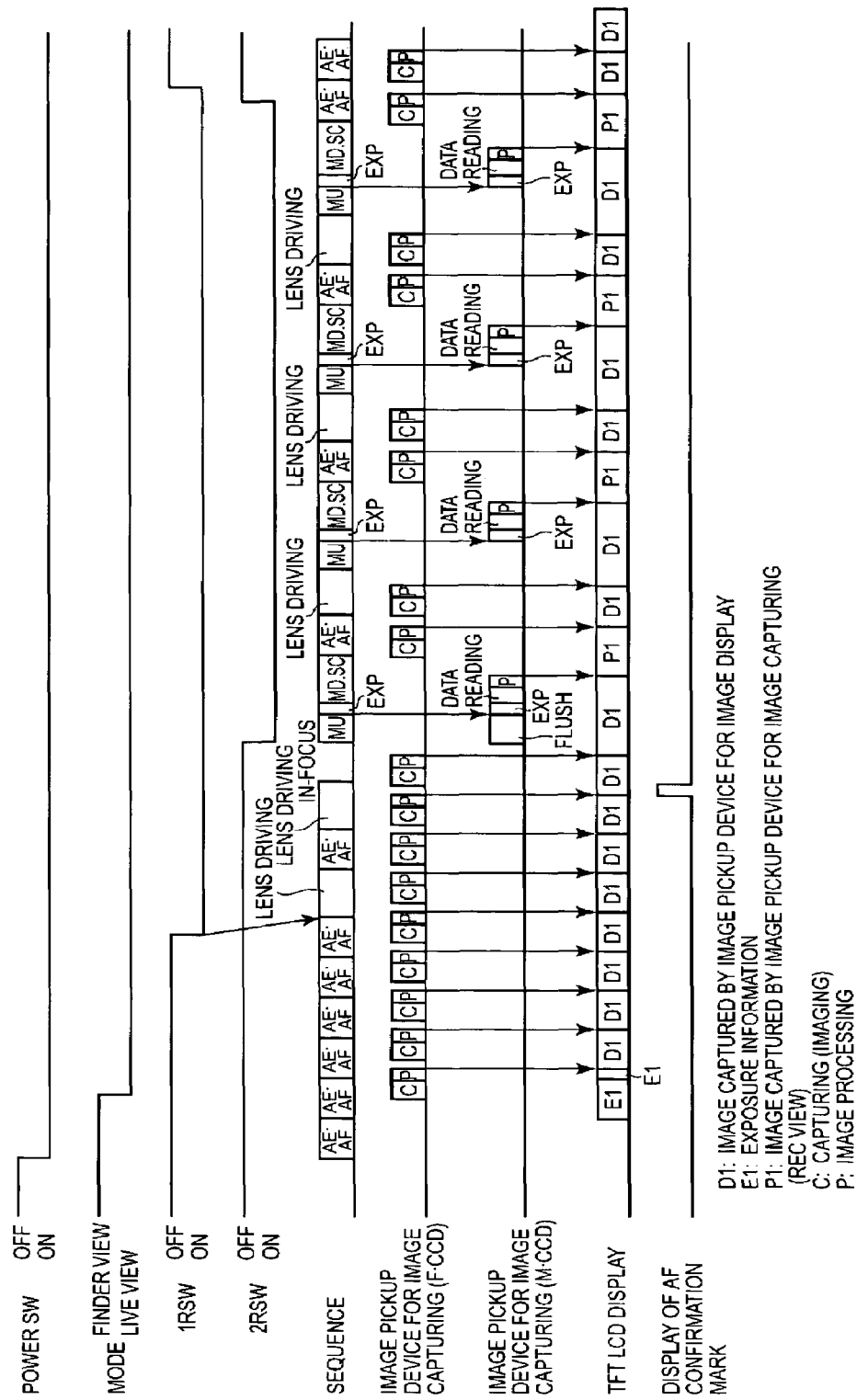
FIG. 4 is a timing chart for explaining the operation of the camera in a live view mode according to the first embodiment of the present invention.
Figure 5:
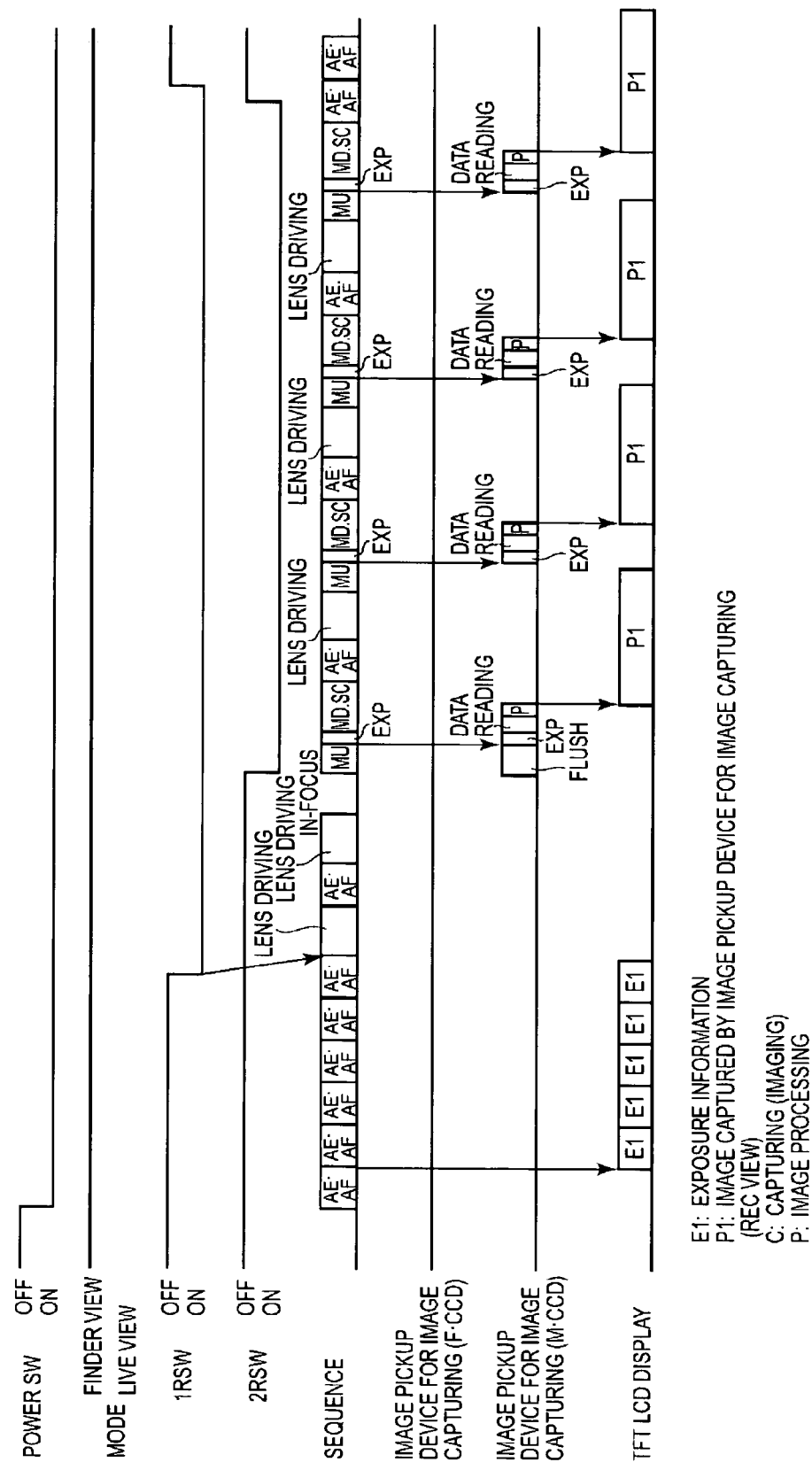
FIG. 5 is a timing chart for explaining the operation of the camera in a finder mode according to the first embodiment of the present invention.

The following describes the basic shooting operation of the camera according to the first embodiment of the present invention with reference to timing charts of FIGS. 4 and 5.

FIG. 4 is a timing chart for explaining the operation of the camera in the live view mode according to the first embodiment of the present invention. FIG. 5 is a timing chart for explaining the operation of the camera in the finder mode according to the first embodiment of the present invention. In the timing charts of FIGS. 4 and 5, AE denotes automatic exposure, AF is auto focus, EXP is an actual exposure, MU and MD are the withdrawal and recovery of the first reflection mirror 51, SC is shutter charge, E1 is exposure information, C is image capturing (imaging), P is image processing, P1 is an image captured by the image pickup device 67 for image capturing, and D1 is an image captured by the image pickup device 61 for image display, respectively.

The shooting operation in the live view mode will first be described.

When the power switch lever 33 is operated to power on the camera 1, the photometric sensor 63 and the AF sensor unit 71 repeat an AE and AF sequence at predetermined intervals. If the camera 1 is set in the finder mode, then the exposure information is displayed on the LCD monitor 36 provided on the back face of the camera body 30. Then, when the mode dial 32 is operated at predetermined timing to switch over to the live view mode, the image pickup device 61 for image display starts operating so that a captured image will be processed and displayed on the LCD monitor 36. After that, this sequence of operations is repeated.

Then, when the shutter button 31 is pressed halfway to turn on the first shutter release switch (1RSW), the camera 1 starts the shooting preparation operation. In other words, the photographing lens 11 is driven to focus on the subject. When the photographing lens 11 comes to the focus range, one of the LEDs 64 for focused indication is turned on. Then, the camera 1 remains in this condition until the shutter button 31 is fully pressed to turn on the second shutter release switch (2RSW).

After that, when the second shutter release switch is turned on, the first reflection mirror 51 is withdrawn out of the shooting optical path, and the aperture is narrowed to fit the image capturing. At the same time, the electric charge is flushed from the image pickup device 67 for image capturing. After completion of the actual exposure, data of the image captured is read and processed. On the other hand, after completion of the actual exposure (image capturing with the image pickup device 67), the first reflection mirror 51 is returned to the shooting optical path, and the shutter charge mechanism 75 charges the shutter. The image processed after captured by the imaging device 67 for image capturing appears on the LCD monitor 36 for a predetermined period of time. Then, when the predetermined period of time has passed, the image captured by the image pickup device 61 for image display is displayed again on the LCD monitor 36.

When the imaging device 67 for image capturing captures images continuously, for example, four times, the image to be displayed on the LCD monitor 36 is switched from the image captured by the imaging device 61 for image display to the image captured by the imaging device 67 for image capturing each time the imaging device 67 for image capturing performs image pickup. After that, when the first and second shutter release switches are turned off, the image captured by the imaging device 61 for image display appears on the LCD monitor 36.

The shooting operation in the finder mode will next be described with reference to FIG. 5.

When the power switch lever 33 is operated to power on the camera 1, the photometric sensor 63 and the AF sensor unit 71 repeat the AE and AF sequence at predetermined intervals. During this repetition, exposure information is displayed on the LCD monitor 36 provided on the back face of the camera body 30. Then, when the shutter button 31 is pressed halfway at predetermined timing to turn on the first shutter release switch, the camera 1 starts the shooting preparation operation. In other words, the photographing lens 11 is driven to focus on the subject. When the photographing lens 11 comes to the focus range, one of the LEDs 64 for focused indication is turned on. Then, the camera 1 remains in this condition until the shutter button 31 is fully pressed to turn on the second shutter release switch (2RSW). During this shooting preparation operation, since the photographer is looking into the viewfinder 43 for shooting, nothing appears on the LCD monitor 36 to avoid unnecessary display for the purpose not only of saving energy, but also of allowing the photographer to focus attention on shooting.

Then, when the second shutter release switch is turned on, the first reflection mirror 51 is withdrawn out of the shooting optical path, and the aperture is narrowed to fit the image capturing. At the same time, the electric charge is flushed from the image pickup device 67 for image capturing. After completion of the actual exposure, data of the image captured is read and processed. On the other hand, after completion of the actual exposure, the first reflection mirror 51 is returned to the shooting optical path, and the shutter charge mechanism 75 charges the shutter. The image processed after captured by the imaging device 67 for image capturing appears on the LCD monitor 36 for a predetermined period of time. Then, the LCD monitor 36 is turned off and remains off during preparation for the next shooting. After that, the next image processed after captured by the imaging device4 67 for image capturing appears on the LCD monitor 36.

When the imaging device 67 for image capturing captures images continuously, for example, four times, an image captured each time the imaging device 67 performs image pickup is displayed on the LCD monitor 36. Note that the imaging device 61 for image display is not in operation in the finder mode.

Figure 6:
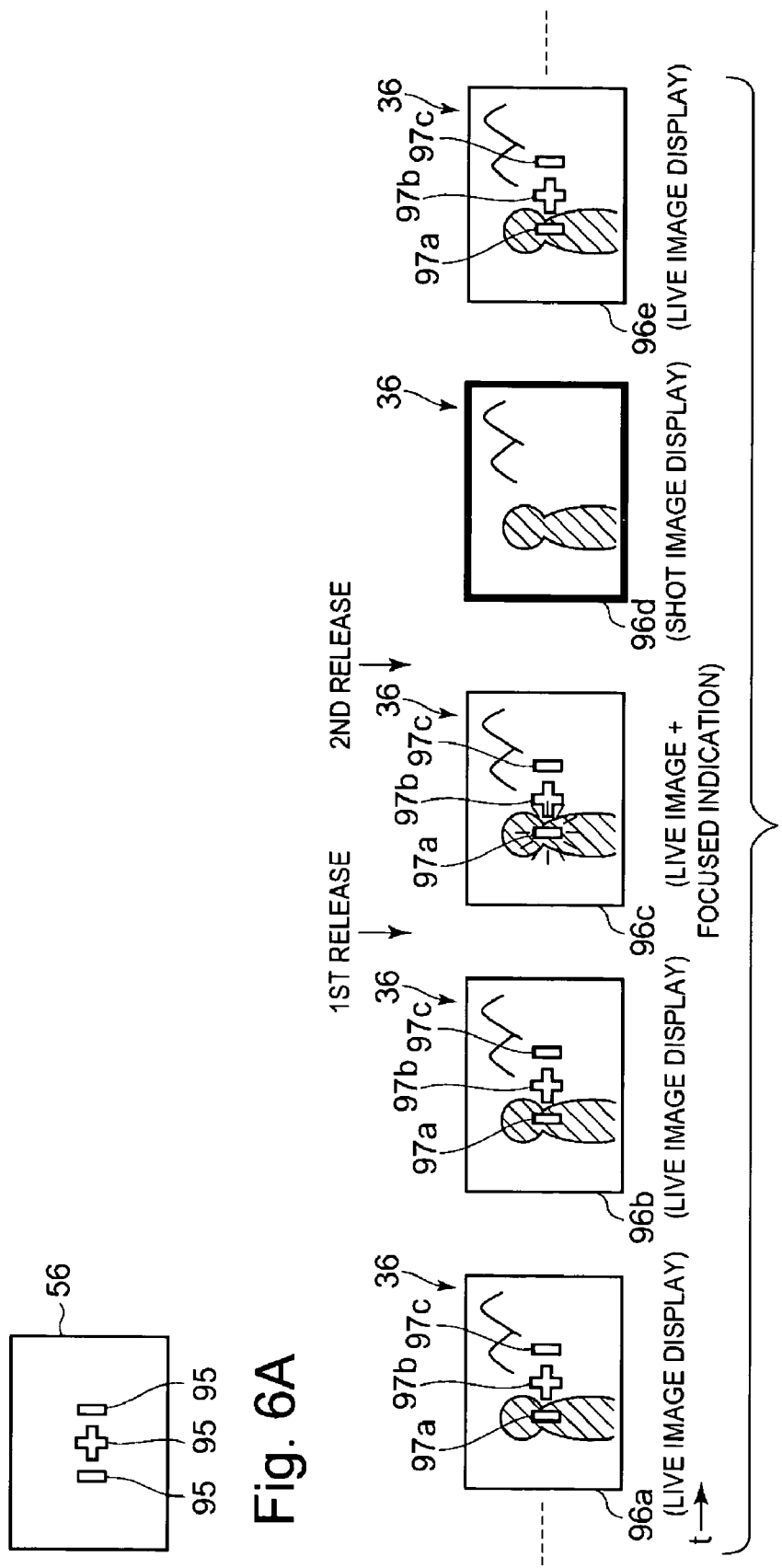
FIG. 6A shows an example of a focusing screen 56 to explain an image observed in a viewfinder 43 and an image displayed on an LCD monitor 36.
FIG. 6B shows an example of a series of display images on the LCD monitor 36 to explain the image observed in the viewfinder 43 and the image displayed on the LCD monitor 36.

The following describes an image observed in the viewfinder 43 and an image displayed on the LCD monitor 36 with reference to FIGS. 6A and 6B.

FIG. 6A shows an example of the focusing screen 56. FIG. 6B shows an example of a series of display images on the LCD monitor 36 in the live view mode.

In FIG. 6A, AF target marks (mark-off lines) 95 are imprinted on the surface of the focusing screen 56 as reference points for AF. The photographer looks into the viewfinder 43 to observe an image projected on the focusing screen 56 with the AF target marks 95 provided on it.

On the other hand, a series of images of a subject are displayed as shown in FIG. 6B on the LCD monitor 36 provided on the backside of the camera body 30. The images are updated in time from the leftmost frame to the rightmost frame. The images displayed on the LCD monitor 36 in the live view mode, for example, the live images 96a and 96b are displayed in such a manner to contain the images of the AF target marks 95 (97a, 97b, 97c). Then, when the first (1st) shutter release switch is turned on and the photographing lens is focused, one of the LEDs 64 for focused indication is lit to light a corresponding one of the AF target marks, for example, 97a in the live image 96c.

Under this condition, when the second (2nd) shutter release switch is turned on, an image 96d actually captured by the imaging device 67 for image capturing is displayed on the LCD monitor 36. The image 96d remains displayed for a predetermined period of time. After the predetermined period has passed, a live image 96e with focus marks 97a-97c superimposed in it is displayed on the LCD monitor 36. The display of the image 96d actually captured by the imaging device 67 for image capturing can be differentiated from that of live images, such as with a frame surrounding and enclosing the image 96d as shown.

Thus, the image actually captured is displayed without the AF target marks 95, and this makes it easy for the photographer to distinguish it from live images.

Second Embodiment

In the first embodiment, a mode is selected with the operation of the control dial to switch over between a series of live images and an image actually captured. On the other hand, a second embodiment is such that a lever is switched directly between the two modes to switch over between a series of live images and an image actually captured.

The following describes the structure and operation of the second embodiment. The basic structure and basic shooting operation of a digital camera according to the second embodiment are the same as those of the first embodiment shown in FIGS. 1 through 6. Therefore, portions common to those in the first embodiment are given the same reference numerals and their repetitive description will be omitted.

Figure 7:
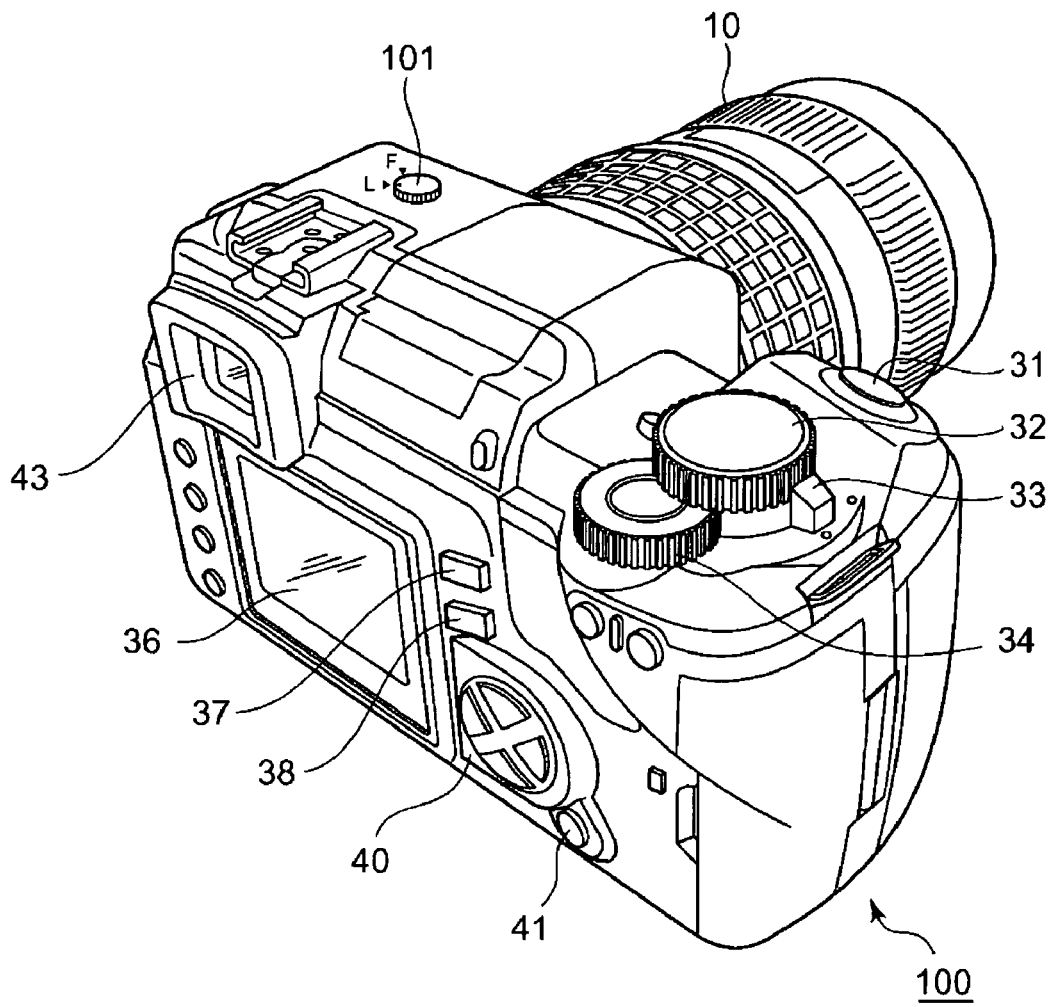
FIG. 7 is an outline perspective view showing the structure of a single-lens reflex digital camera to which an imaging device according to a second embodiment of the present invention is applied.

FIG. 7 is an outline perspective view showing the structure of a single-lens reflex digital camera to which an imaging device according to the second embodiment of the present invention is applied.

In FIG. 7, a finder/live view (F/L) switching lever 101 is provided on the top face of a camera body 100 to switch over between an actually captured image and a live image. For the finder mode, the F/L switching lever 101 is set at a position indicated by "F" on the top face of the camera body 100. For the live view mode, it is set at a position indicated by "L." Thus the photographer can switch over between the actually captured image, and the live image.

Figure 8:
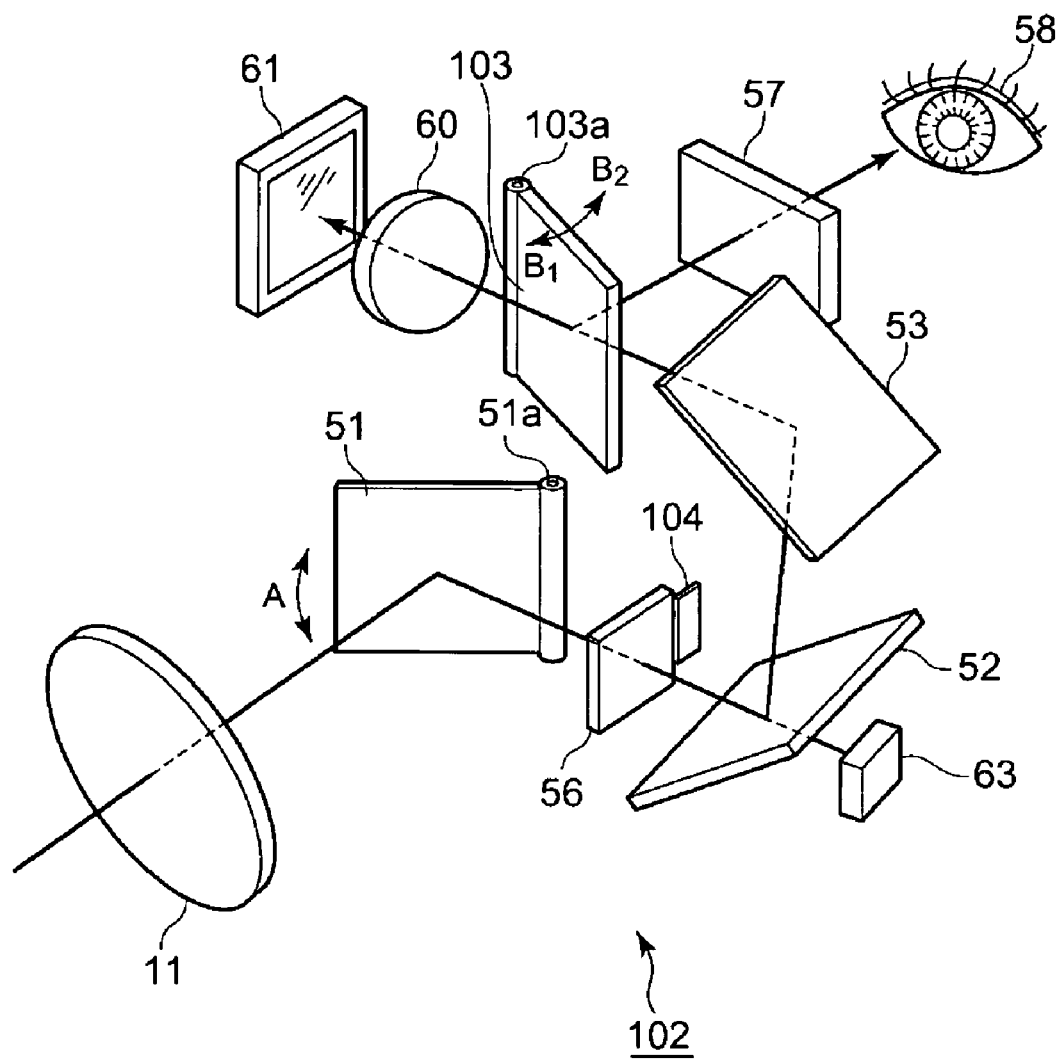
FIG. 8 is a perspective view showing the structure of a finder optical system of the camera according to the second embodiment of the present invention.

FIG. 8 is a perspective view showing the structure of a finder optical system of the camera according to the second embodiment of the present invention.

A finder optical system 102 includes the first reflection mirror 51 with part of the first reflection mirror 51 formed into a half mirror, the second reflection mirror 52 formed as a half mirror, the third reflection mirror 53, a fourth reflection mirror 103 rotatable about an axis 103a in both directions B1 and B2 indicated by a double-headed arrow in FIG. 8, the focusing screen (mat screen) 56, and the eyepiece lens 57.

The photometric sensor 63 is arranged on the backside of the reflection surface of the second reflection mirror 52. An LCD 104 for displaying shooting information and the like is provided adjacent to the focusing screen 56.

Figure 9:
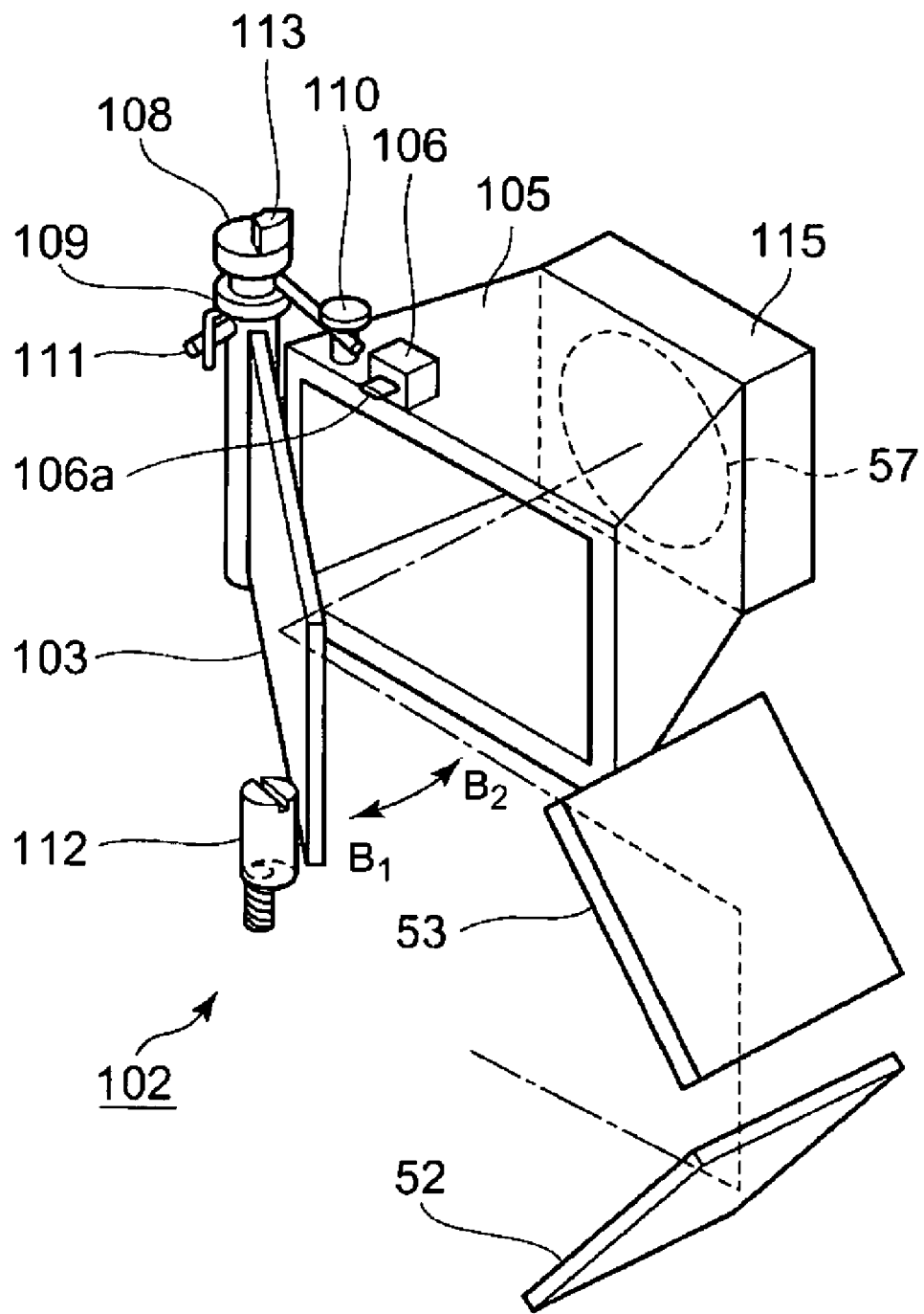
FIG. 9 is a perspective view showing a drive mechanism of a fourth reflection mirror 103 according to the second embodiment of the present invention, in which an eyepiece shutter is open for observation of a subject.
Figure 10:
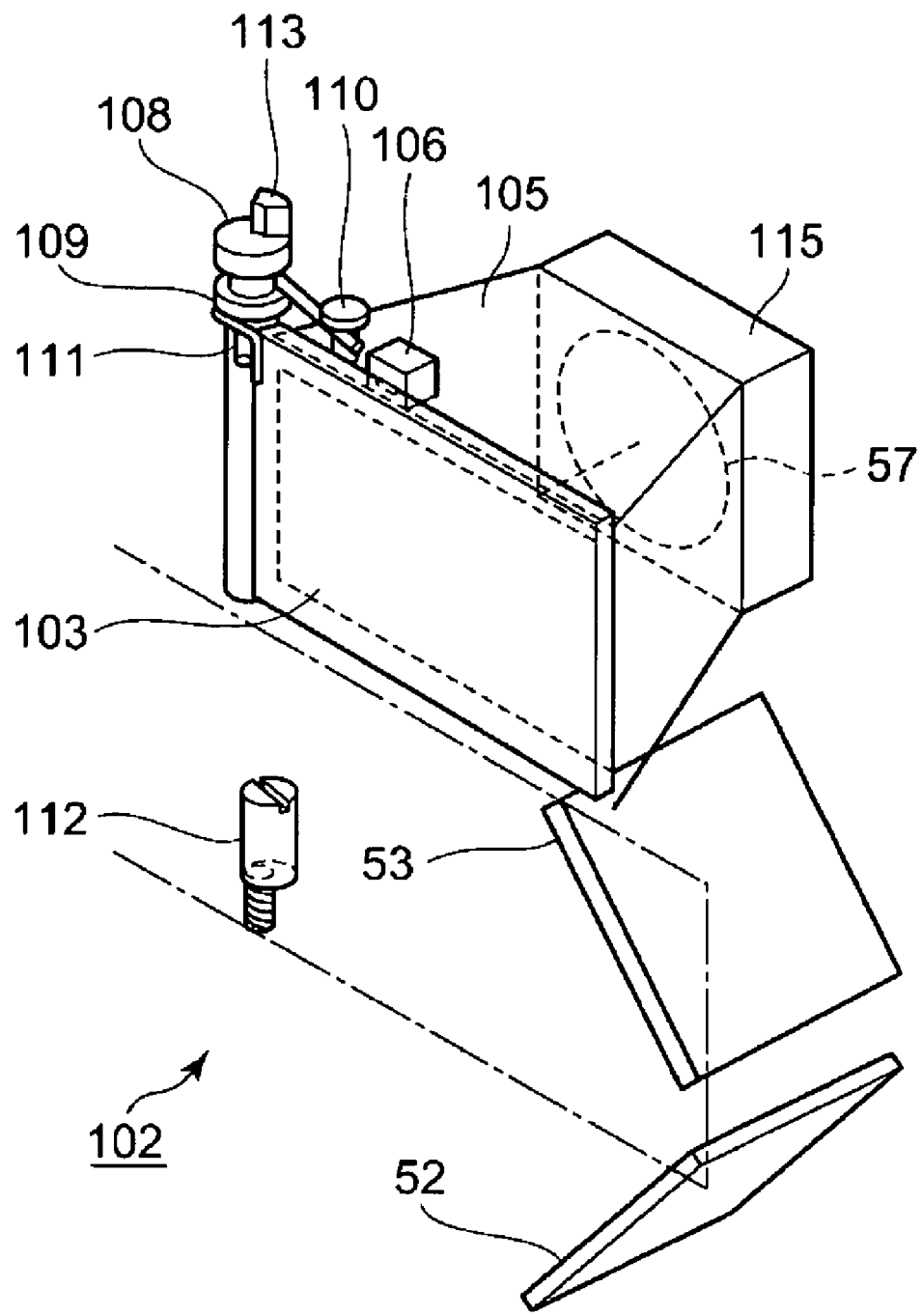
FIG. 10 is a perspective view showing the drive mechanism of the fourth reflection mirror 103 according to the second embodiment of the present invention, in which the eyepiece shutter is closed.
Figure 11:
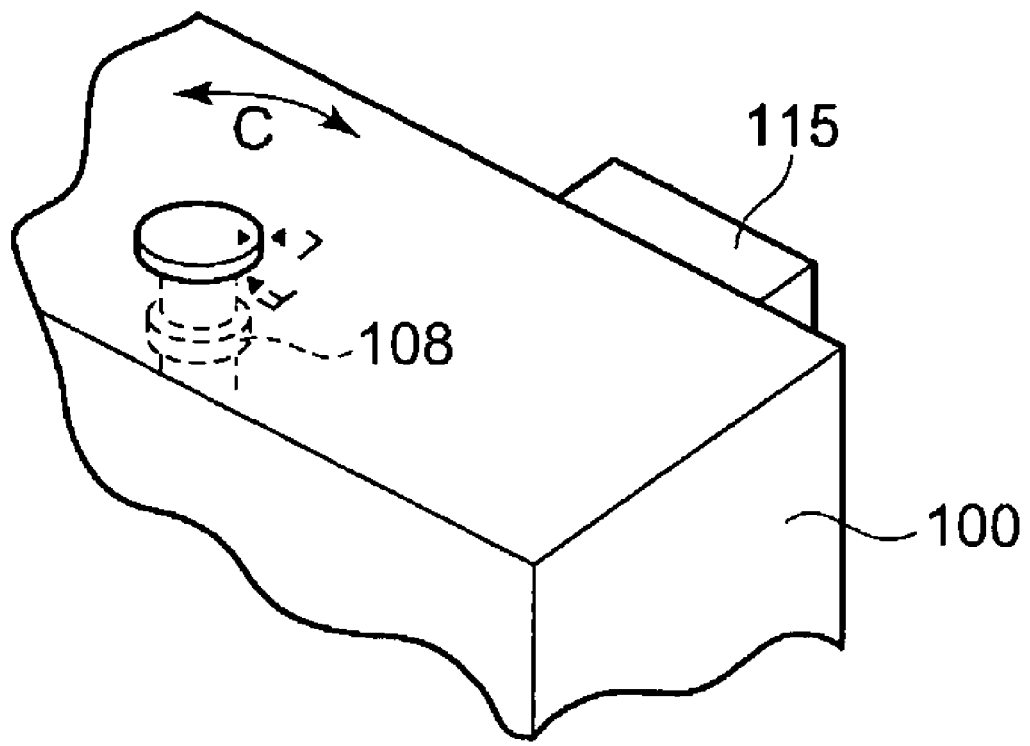
FIG. 11 is a partially cutaway view showing an F/L mode switching lever 101 in the second embodiment of the present invention.

FIGS. 9 and 10 are perspective views showing a drive mechanism of the fourth reflection mirror 103 according to the second embodiment of the present invention. FIG. 9 shows a state in which an eyepiece shutter is open for observation of a subject. FIG. 10 shows a state in which the eyepiece shutter is closed. In addition, FIG. 11 is a partially cutaway view showing the F/L mode switching lever 101 in the second embodiment of the present invention.

The fourth reflection mirror 103 is rotatably attached to a rotary shaft 108 (that is, which can rotate about the rotary shaft 108 in both directions B1 and B2 indicated by the arrow in FIG. 8) near an eyepiece frame 105 on which an eyepiece 115 is mounted. A spring (toggle spring) 109 is wound around the rotary shaft 108. One end of the spring is held by a spring trigger pin 110 provided irror 52 in a direction opposite to the reflective 05, and the other end is caught by a spring trigger pin 111 provided on the rotary shaft 108.

An F/L detection switch 106 is provided near the opening of the eyepiece frame 105 to switch over between the finder/live view modes depending on the open/closed state of the fourth reflection mirror 103. A detection portion 106a is provided on the F/L detection switch 106 in the form of a projection. As shown in FIG. 10, when pushed in by the fourth reflection mirror 103, the detection portion 106a of the F/L detection switch 106 detects that the fourth reflection mirror 103 has been closed. On the other hand, when released, the detection portion 106a detects that the fourth reflection mirror 103 has been opened.

The spring 109 is biased in a direction to open the fourth reflection mirror 103 (in the direction B1 in FIG. 9), so that the fourth reflection mirror 103 is normally in contact with a stopper 112 as shown in FIG. 9. Under this condition, a light beam guided through the second reflection mirror 52 and the third reflection mirror 53 is reflected by the fourth reflection mirror 103 to reach the eyepiece 105. The stopper 112 is fixed, for example, on the top of a mirror box (not shown) in which the first reflection mirror 51 and the like are housed. The stopper 112 is eccentrically mounted so that a minor adjustment can be made to the angle of the fourth reflection mirror 103.

A projection portion 113 provided on the top of the rotary shaft 108 is interlocked with the F/L switching lever 101 shown in FIG. 11 through an engagement member, not shown. In other words, when the F/L switching lever 101 is operated in a counterclockwise direction of arrow C in FIG. 11, the rotary shaft 108 is rotated along with the operation of the F/L switching lever 101 to rotate the fourth reflection mirror 103 in the direction of arrow B2 shown in FIG. 9.

As a result, as shown in FIG. 10, the fourth reflection mirror 103 comes in contact with the eyepiece frame 105 so that a subject image will be captured by the imaging device 61 for image display as a live image. At this moment, since an external light beam from the eyepiece 115 is blocked inside the eyepiece frame 115 by the fourth reflection mirror 103, no light is incident into the camera body 30. In addition, the B μcom 80 is informed that the eyepiece 115 is light-shielded with the operation of the F/L detection switch 106.

The F/L switching lever 101 can be provided with a known lock mechanism or a hook portion. Further, the F/L switching lever 101 and the rotary shaft 108 can be connected, for example, by an overcharge mechanism engaged through a spring, or directly with each other.

Figure 12:
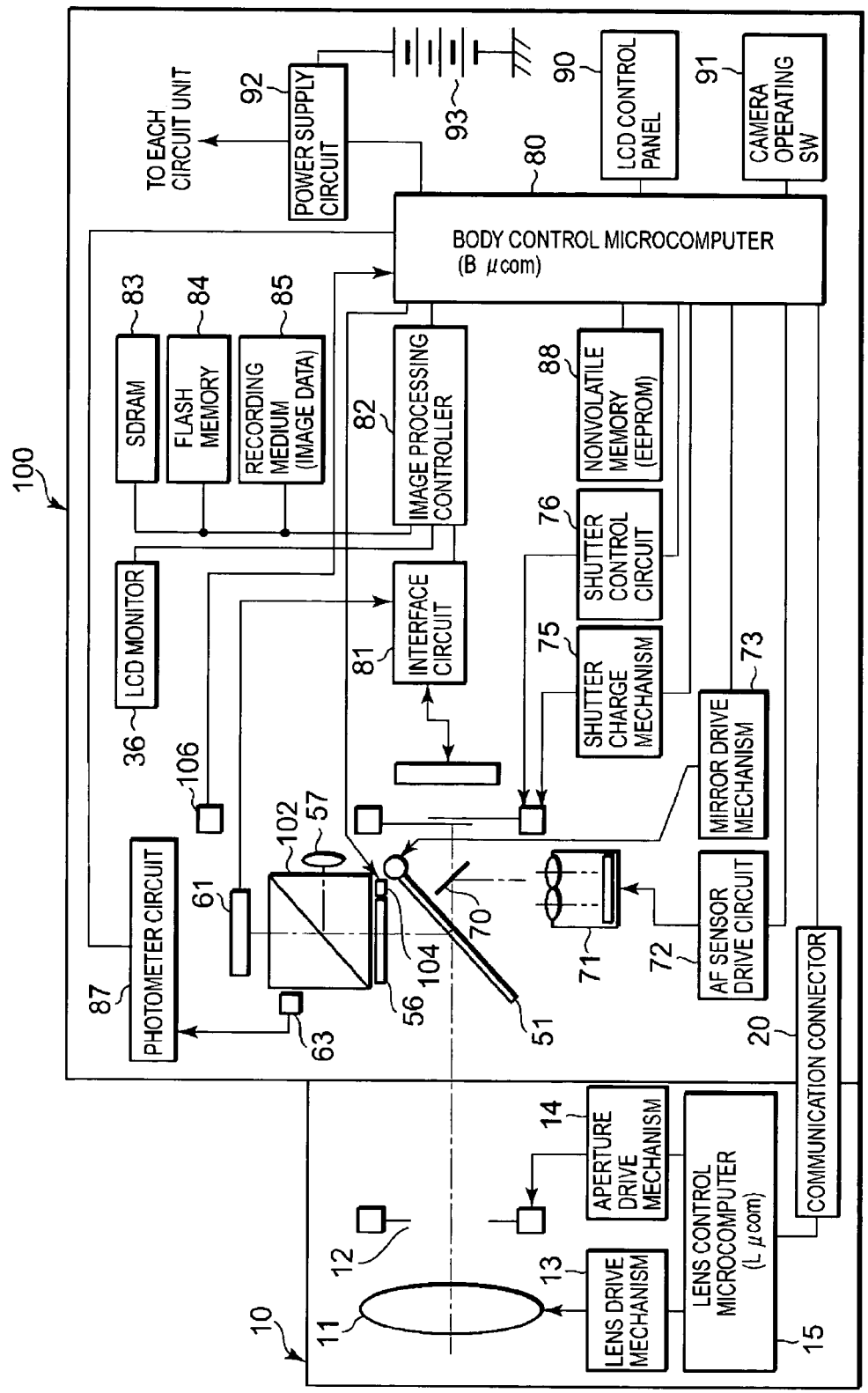
FIG. 12 is a block diagram showing a system configuration of the camera according to the second embodiment of the present invention.

FIG. 12 is a block diagram showing a system configuration of the camera according to the second embodiment of the present invention.

In FIG. 12, the LCD 104 for information display arranged near the focusing screen 56 and the F/L detection switch 106 are connected to the B μcom 80. The B μcom 80 controls the lighting state of the LCD 104 for information display depending on the detection state of the F/L detection switch 106.

The basic shooting operation of the camera according to the second embodiment is performed in the same way as that in the first embodiment according to the timing charts shown in FIGS. 4 and 5. A different point is that the switching between the live view mode and the finder mode is done in the first embodiment by selecting a mode with the operation of the control dial, whereas the switching between the live view mode and the finder mode is done in the second embodiment by switching the F/L mode switching lever 101 and detecting the switching of the F/L mode switching lever 101 through the F/L detection switch 106.

A description will next be made of images displayed on the LCD monitor 36 in the second embodiment with reference to FIGS. 13A and 13B.

Figure 13A:
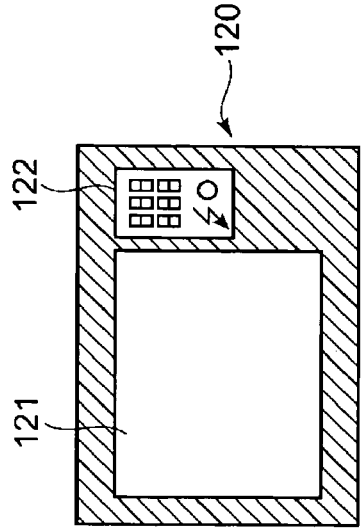
FIG. 13A shows an example of an image captured by an imaging device 61 for image display and displayed on the LCD monitor 36 according to the second embodiment of the present invention.

FIG. 13A shows an example of an image captured in the live view mode by the imaging device 61 for image display. FIG. 13B shows a series of display images on the LCD monitor 36.

In FIG. 13A, the imaging device 61 for image display forms a finder image 120 consisting of a subject image display part 121 and a shooting information display part 122 according to the display image on the focusing screen 56 and the LCD 104 for information display. The photographer can see the captured finder image on the LCD monitor 36 to observe a subject image displayed in the subject image display part 121 while obtaining various kinds of information related to the shooting conditions, such as shutter speed and exposure, displayed in the shooting information display part 122.

Figure 13B:
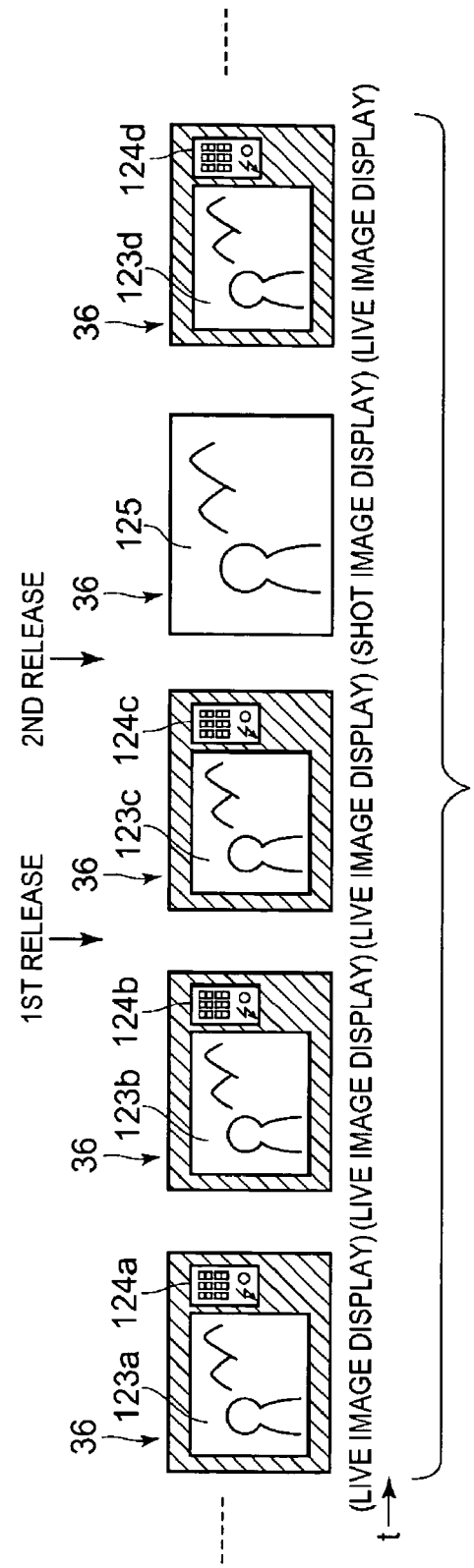
FIG. 13B shows an example of a series of display images on the LCD monitor 36 according to the second embodiment of the present invention.

As shown in FIG. 13B, images 123*a* and 124*a* corresponding to the subject image display part 121 and the shooting information display part 122 are displayed on the LCD monitor 36 provided on the back face of the camera body 30 in the same manner as in FIG. 6B. The images are updated in time from the leftmost frame to the rightmost frame in FIG. 13B. The images displayed on the LCD monitor 36 in the live view mode, for example, live images 123*a*, 123*b* and the images 124*a*, 124*b* of the shooting information are displayed on the LCD monitor 36. Then, when the first (1st) shutter release switch is turned on as mentioned above, the live images 123*c* and 124*c* appear on the LCD monitor 36.

Under this condition, when the second (2nd) shutter release switch is turned on, only an image 125 actually captured by the imaging device 67 for image capturing is displayed on the LCD monitor 36 instead of the finder image, consisting of the live image and the image of the shooting information at the side of the live image, which has been displayed just before the second (2nd) shutter release switch is turned on. Then, after the image 125 is displayed for a predetermined period of time, a live image 123*d* and a shooting information image 124*d* appear on the LCD monitor 36.

Thus, when a live view display is made, the shooting information is displayed together with a subject image, while when the display of an actually captured image is made, only the subject image is displayed. This makes it easy for the photographer to distinguish between the live image and the actually captured image.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A digital camera comprising:
  a first imaging section for acquiring subject image data from a light beam of a subject passing through a photographing lens;
  a movable mirror capable of being moved in or out of the imaging optical path of the first imaging section so that, when located in the imaging optical path, it will guide the light beam of the subject to a finder optical system;
  a mat screen that is part of the finder optical system to be formed a subject image thereon by the light beam of the subject reflected by the movable mirror;
  a second imaging section for acquiring finder image data including the subject image formed on the mat screen;
  a display section capable of displaying the images acquired by the first and second imaging sections in different forms distinguishable from each other; and
  a control section for switching the display contents of the display section depending on the movement of the movable mirror.

2. The digital camera according to claim 1, wherein the second imaging section captures a focus frame provided on the mat screen or display information provided in the finder optical system together with the subject image formed on the mat screen.

3. The digital camera according to claim 2, wherein when the movable mirror is located in the imaging optical path, the second imaging section repeats the imaging operation while the display section displays image data acquired by the second imaging section continuously.

4. The digital camera according to claim 3, wherein the display section stops updating the display image in response to the start of the withdrawal of the movable mirror from the imaging optical path.

5. The digital camera according to claim 3, wherein the display section freezes the display image during the withdrawal of the movable mirror from the imaging optical path.

6. The digital camera according to claim 3, wherein the display section freezes the display image in response to the start of the withdrawal of the movable mirror from the imaging optical path, and after completion of the imaging operation of the first imaging section, it displays subject image data acquired by the first imaging section.

7. A digital camera comprising:

a finder optical system including a plurality of mirrors for observation of a subject;

a first imaging section for converting a light beam, coming from the subject through a photographing lens, into electric signals;

a movable mirror capable of being moved in or out of the imaging optical path of the first imaging section so that, when located in the imaging optical path, it will guide the light beam of the subject to the finder optical system;

a display section for displaying image data acquired by the first imaging section;

a second imaging section, different from the first imaging section, for converting the light beam of the subject guided to the finder optical system into electric signals; and a control section for switching the image data acquired by the first imaging section to the image data acquired by the second imaging section in response to the movement of the movable mirror to display the image data acquired by the second imaging section on the display section in a form different from that of the image data acquired by the first imaging section.

8. The digital camera according to claim 7, further comprising a mat screen that is part of the finder optical system to be formed a subject image thereon by the light beam of the subject reflected by the movable mirror, wherein the second imaging section captures a focus frame provided on the mat screen or display information provided in the finder optical system together with the subject image formed on the mat screen.

9. The digital camera according to claim 8, wherein when the movable mirror is located in the imaging optical path, the second imaging section repeats the imaging operation while the display section displays image data acquired by the second imaging section continuously.

10. The digital camera according to claim 9, wherein the display section stops updating the display image in response to the start of the withdrawal of the movable mirror from the imaging optical path.

11. The digital camera according to claim 9, wherein the display section freezes the display image during the withdrawal of the movable mirror from the imaging optical path.

12. The digital camera according to claim 9, wherein the display section freezes the display image in response to the start of the withdrawal of the movable mirror from the imaging optical path, and after completion of the imaging operation of the first imaging section, it displays subject image data acquired by the first imaging section.

* * * * *